United States Patent [19]

Ishiodori

[11] 4,344,082
[45] Aug. 10, 1982

[54] APPARATUS FOR RECOVERING A FREQUENCY-CONVERTED CHROMINANCE COMPONENT THAT IS SUBSTANTIALLY FREE OF CROSS-TALK COMPONENTS

[75] Inventor: Makoto Ishiodori, Ebina, Japan

[73] Assignee: Sony Corporation, Tokyo, Japan

[21] Appl. No.: 168,026

[22] Filed: Jul. 14, 1980

[30] Foreign Application Priority Data

Jul. 17, 1979 [JP] Japan .................................. 54-90616

[51] Int. Cl.³ .............................................. H04N 5/78
[52] U.S. Cl. ...................................................... 358/8
[58] Field of Search ......................... 358/4, 8; 360/14

[56] References Cited

U.S. PATENT DOCUMENTS

| | | | |
|---|---|---|---|
| 4,007,482 | 2/1977 | Amari | 358/4 |
| 4,007,484 | 2/1977 | Amari | 358/8 |
| 4,177,481 | 12/1979 | Yamagiwa et al. | 358/8 |
| 4,178,606 | 12/1979 | Hirota | 358/4 |
| 4,208,673 | 6/1980 | Numakura | 358/8 |
| 4,217,603 | 8/1980 | Hjortzberg | 358/8 X |

Primary Examiner—Bernard Konick
Assistant Examiner—Donald McElheny, Jr.

Attorney, Agent, or Firm—Lewis H. Eslinger; Alvin Sinderbrand

[57] ABSTRACT

Apparatus is provided for recovering, from a composite video signal which is reproduced from successive record tracks on a record medium, a frequency-converted chrominance component that is substantially free of cross-talk components. The frequency-converted chrominance components which are recorded in adjacent tracks have chrominance carriers which exhibit a frequency interleaved relationship with respect to each other. During reproduction, at least the frequency-converted chrominance component, together with an accompanying cross-talk component, is reproduced from the respective tracks. A cross-talk separating circuit, including a comb filter, is supplied with the reproduced chrominance component and separates the cross-talk component therefrom. A combining circuit functions to combine the separated cross-talk component and the reproduced frequency-converted chrominance component to produce a frequency-converted chrominance component that is substantially free of cross-talk components. In accordance with one feature, the cross-talk free, frequency-converted chrominance component is supplied directly to the recording circuit of a video signal recorder.

19 Claims, 6 Drawing Figures

APPARATUS FOR RECOVERING A FREQUENCY-CONVERTED CHROMINANCE COMPONENT THAT IS SUBSTANTIALLY FREE OF CROSS-TALK COMPONENTS

BACKGROUND OF THE INVENTION

This invention relates to apparatus for recovering a frequency-converted chrominance component that is substantially free of cross-talk components and, more particularly, to such apparatus which is useful in recovering such frequency-converted chrominance components from a video signal recorder, such as a video tape recorder (VTR) of the type in which composite video signals are recorded with frequency-modulated luminance components and frequency-converted chrominance components, the latter being recorded in adjacent tracks and exhibiting a frequency interleaved relationship with respect to each other.

High density VTR's are known, such as described in U.S. Pat. Nos. 4,007,482 and 4,007,484, wherein a composite video signal is separated into its luminance and chrominance components, the luminance component being frequency-modulated to a higher frequency range and the chrominance component being frequency-converted to a lower frequency range. The frequency-modulated luminance component and the frequency-converted chrominance component then are superimposed, or combined, and recorded in successive, adjacent tracks. To obtain a high density of recording, such tracks are recorded without guard bands therebetween. To avoid undesired cross talk which may be picked up from an adjacent track when a particular track is scanned, these patents describe techniques by which the luminance and chrominance components are recorded. The well-known phenomenon known as azimuth loss is used to record successive tracks with different recording transducers, or heads, these heads having gaps with different azimuth angles. Thus, when a relatively higher frequency signal, such as the frequency-modulated luminance component, that is recorded by, for example, head A is reproduced by head B, substantial attenuation of that frequency-modulated luminance component will obtain, thereby minimizing or avoiding cross talk interference therewith. Of course, such azimuth loss is not present when the same head (for example, head A) is used for reproduction as was used for recording.

Although this phenomenon of azimuth loss is turned to account to avoid cross talk interference in the reproduction of the frequency-modulated luminance components, significant attenuation is not present when different heads are used to reproduce the relatively lower frequency signals, such as the frequency-converted chrominance components. The aforementioned patents describe particular techniques which are used to record and reproduce chrominance components so as to minimize, or avoid, cross talk interference. More particularly, the frequency of the chrominance subcarrier is modified such that the chrominance subcarrier frequency that is recorded in one track differs from the chrominance subcarrier frequency that is recorded in the next adjacent track. In particular, these different chrominance subcarrier frequencies exhibit a so-called "frequency interleaved" relationship with respect to each other. That is, the chrominance subcarrier frequency, and various harmonics thereof, recorded in one track differs from the chrominance subcarrier frequency, and corresponding harmonics thereof, recorded in the next adjacent track such that, if these frequencies are superimposed one upon the other, they would appear to be interleaved. This interleaved relationship is particularly advantageous in eliminating cross-talk interference. When the reproduced chrominance component is passed through a comb filter, if the frequencies at which that filter exhibits maximum attenuation correspond to the various cross talk frequencies picked up from the adjacent track, then cross talk interference in the chrominance component is substantially attenuated and, thus, eliminated.

In the aforementioned patents, the frequency interleaved relationship between the chrominance components which are recorded in adjacent tracks is attained by, for example, inverting the phase of the chrominance subcarrier at each successive line interval in one track, and maintaining the phase of the chrominance subcarrier constant from one line interval to the next in the next adjacent track. This technique is advantageous because the chrominance subcarrier frequency may be the same in each track; but the aforementioned phase modulation is tantamount to recording the chrominance component with different subcarrier frequencies.

In VTR's wherein the composite video signals are recorded in the aforedescribed manner, that is, the composite video signals are recorded by frequency-modulating the luminance component to a higher frequency range while frequency-converting the chrominance component to a lower frequency range, making sure that the frequency-converted chrominance subcarrier in adjacent tracks exhibits the aforementioned frequency interleaved relationship, the composite video signal which is recorded on one record medium, that is, magnetic tape, may be transferred to a second record medium, or magnetic tape. Such editing, or dubbing, operations heretofore have been carried out by recovering the frequency-modulated luminance component and the frequency-converted chrominance component, operating separately on such components to return them to their original frequency ranges, re-forming the original composite video signal, and then separating that re-formed composite video signal into its separate luminance and chrominance components, whereupon these separate components are processed in the aforedescribed manner. Such processing of at least the chrominance component may introduce undesired deteriorations into the signal, thus resulting in corresponding deteriorations or degradation of the quality of the picture which ultimately is reproduced therefrom.

To avoid the foregoing disadvantage, it may be thought that the frequency-converted chrominance component, as reproduced from the first record medium, may be supplied directly for recording on the second record medium while remaining in its frequency-converted condition. This would avoid frequency re-conversion back to its original frequency range and then, once again, frequency-converting the chrominance component to its lower frequency range. However, when the composite video signals are recorded in adjacent tracks without guard band, the reproduced frequency-converted chrominance component often is accompanied by undesired cross talk interference. Such cross talk must be eliminated from the frequency-converted chrominance component before it can be re-recorded. However, in cross talk elimination techniques which have been employed heretofore, cross talk interference is removed from the reproduced chrominance component only after that component has been frequency re-converted back to its original frequency range. Thus, it has not been possible to transfer a frequency-converted chrominance component, substantially free of cross talk components, without first re-converting the chrominance component back to its original frequency range. However, such re-conversion, followed by a subsequent frequency conversion, is not desired.

OBJECTS OF THE INVENTION

Therefore, it is an object of the present invention to provide improved apparatus for recovering a frequency-converted chrominance component, substantially free of cross talk components, without requiring a frequency re-conversion of that chrominance component.

Another object of this invention is to provide apparatus which is useful in editing, or dubbing, composite video signals which avoid the aforenoted disadvantages and defects of the prior art.

A still further object of this invention is to provide apparatus for recovering a frequency-converted chrominance component, and for enabling that recovered component to be transferred to a record medium directly, that is, without requiring frequency re-conversion thereof, while eliminating undesired cross talk interference therewith.

An additional object of this invention is to provide a system for transferring at least the frequency-converted chrominance component, reproduced from one record medium, directly to a second record medium, without requiring a frequency re-conversion and then a subsequent frequency conversion operation, while eliminating undesired cross talk interference.

Yet another object of this invention is to provide apparatus for eliminating cross talk components from a frequency-converted chrominance component, while maintaining that chrominance component in its frequency-converted range.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for recovering a frequency-converted chrominance component from a composite video signal that is reproduced from successive record tracks on a record medium, the recovered frequency-converted chrominance component being substantially free of cross talk components, without requiring any frequency re-conversion of the chrominance component back to its original frequency range. The frequency-converted chrominance components which are recorded in adjacent tracks have chrominance carriers which exhibit a frequency interleaved relationship with respect to each other. During reproduction of such signals, the frequency-converted chrominance component is accompanied by a cross-talk component that may be picked up from an adjacent track. A cross-talk separating circuit, including a comb filter, separates the cross-talk component from the reproduced frequency-converted chrominance component. A combining circuit combines the separated cross-talk component and the reproduced frequency-converted chrominance component so as to produce a frequency-converted chrominance component that is substantially free of cross talk components.

In accordance with one advantageous feature of the present invention, the frequency-converted chrominance component that is substantially free of cross talk components may be recorded, practically directly, onto a second record medium, while still in its frequency-converted range. This facilitates editing, or dubbing, of video signals from one record medium to another.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
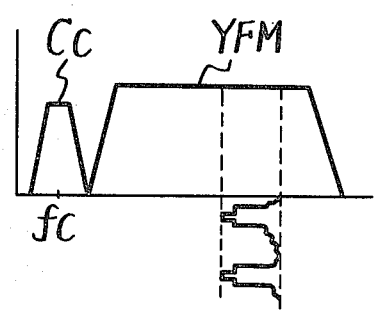
FIG. 1 illustrates the frequency spectrum of a typical composite video signal that is recorded by frequency-modulating the luminance components to a higher frequency range while frequency-converting the chrominance component to a lower frequency range.

Before describing particular embodiments of the present invention, reference is made to FIG. 1 which represents the typical frequency spectrum of the composite video signal that is recorded by a so-called helical scan VTR having two recording heads for recording successive tracks of video signals without guard band separation therebetween. Typical of such a VTR is the apparatus described in aforementioned U.S. Pat. Nos. 4,007,482 and 4,007,484. In such helical scan VTR's, the composite video signal is separated into its luminance and chrominance components. The luminance component is frequency-modulated to a relatively higher frequency range, represented in FIG. 1 as the frequency-modulated luminance component $Y_{FM}$, and the chrominance component is frequency-converted down to a relatively lower frequency range, illustrated as the frequency-converted chrominance component $C_c$. The chrominance subcarrier frequency exhibited by the frequency-converted chrominance component $C_c$ is illustrated as the chrominance subcarrier frequency $f_c$. A central frequency in the band containing the frequency-modulated luminance component $Y_{FM}$ represents, for example, the tip of the horizontal synchronizing signal, and higher frequencies in this band represent, for example, the pedestal level, and other brightness levels.

The frequency-converted chrominance component and the frequency-modulated luminance component then are superimposed, or multiplexed, as by supplying both components to a mixing circuit, for recording by one or the other recording heads in the same track. Successive tracks are formed adjacent each other without guard band separation.

Figure 2:
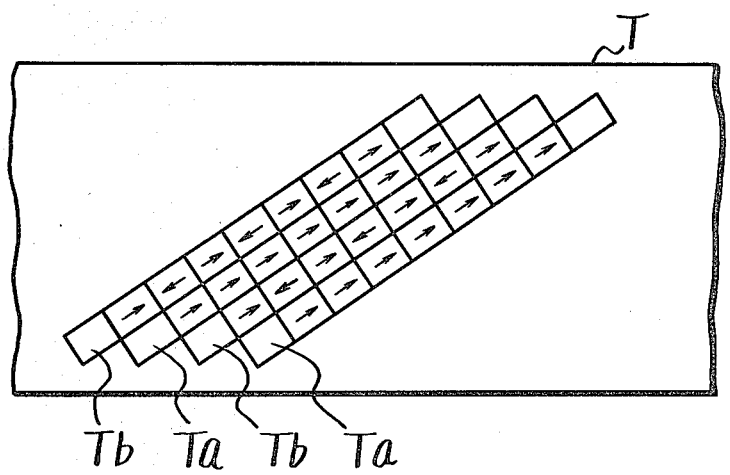
FIG. 2 is a schematic representation of a section of magnetic tape in which adjacent record tracks are formed, containing frequency-converted chrominance components that exhibit the frequency interleaved relationship with respect to each other.

A schematic representation of the tracks which are formed by the two-head helical scan VTR is shown in FIG. 2. For the purpose of the present example, it is assumed that head A records skewed tracks $T_a$, and head B records skewed tracks $T_b$ across tape T. As shown, these tracks are adjacent each other without guard band separation. Furthermore, each track contains the frequency-modulated luminance component having the frequency-converted chrominance component superimposed thereon.

The chrominance components which are recorded in tracks $T_a$ and $T_b$ exhibit chrominance subcarriers that are in frequency interleaved relationship with each other. Furthermore, and as illustrated in FIG. 2, the video signals are recorded in so-called H-alignment. That is, the horizontal synchronizing signals in each track are aligned in the direction that is substantially transverse of the tracks. This minimizes undesired cross talk interference due to horizontal synchronizing signals that are picked up from an adjacent track. To attain the frequency interleaved relationship between the chrominance components recorded in adjacent tracks, the phase of the chrominance subcarrier is inverted in successive line intervals in one track, while the phase of the chrominance subcarrier is not inverted from one line interval to the next in the next adjacent track. As is known, in the NTSC system, the chrominance subcarrier in one line interval is of opposite phase to the chrominance subcarrier in the next line interval. If this phase relationship is inverted from one line interval to the next, then the chrominance subcarrier will exhibit the same phase throughout an entire track, as illustrated by the arrows in track $T_a$. That is, in recording the frequency-converted chrominance component in track $T_a$, the phase of the chrominance subcarrier is inverted at successive line intervals. As shown by the arrows in track $T_b$, the phase of the chrominance subcarrier is not changed, or inverted, from one line interval to the next. Hence, the original phase relationship of the chrominance subcarrier is recorded in track $T_b$, that is, the phase of the chrominance subcarrier for odd line intervals is opposite the phase of the chrominance subcarrier for even line intervals. Thus, as illustrated in FIG. 2, in the VTR of the type described in the aforementioned patents, the phase of the chrominance subcarrier is inverted from one line interval to the next for recording in tracks $T_a$, but the phase of the chrominance subcarrier is not inverted for recording in tracks $T_b$.

Although not represented in FIG. 2, it may be appreciated that the azimuth angles of the gaps of heads A and B differ from each other. Thus, the video signals recorded in tracks $T_a$ are recorded with different azimuth angles than the video signals which are recorded in tracks $T_b$. As a result of these different azimuth angles, the aforementioned phenomenon of azimuth loss attenuates any cross talk interference which may arise when, for example, head A scans track $T_a$ during a reproducing mode, and picks up an interfering frequency-modulated luminance component from adjacent track $T_b$. Azimuth loss effectively attenuates this cross talk component, such that it is eliminated.

Figure 3:
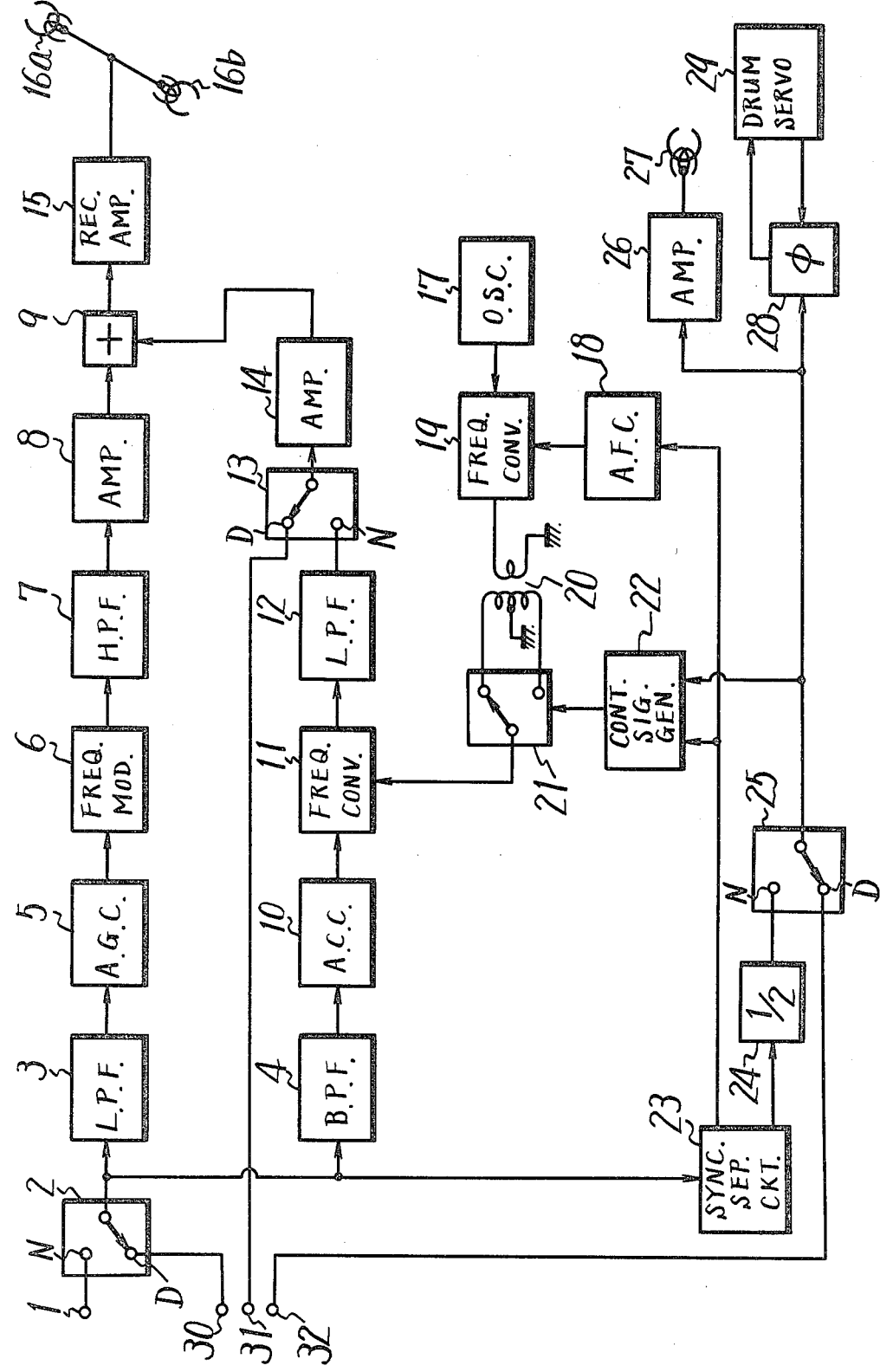
FIG. 3 is a block diagram of recording apparatus which can be used with one embodiment of this invention.

Referring now to FIG. 3, there is illustrated a block diagram of recording apparatus which is adapted to record a composite video signal in tracks $T_a$ and $T_b$, shown in FIG. 2, and also is adapted to be used with the present invention. This recording apparatus is comprised of a luminance channel, adapted to separate the luminance component from a composite video signal supplied thereto, and to frequency-modulate the separated luminance component to a relatively higher frequency range; a chrominance channel, adapted to separate the chrominance component of the composite video signal and to frequency-convert that component to a relatively lower frequency range; and control circuitry which functions to control the operation of the chrominance channel to record the frequency-converted chrominance component with a chrominance subcarrier whose phase exhibits the condition illustrated in FIG. 2.

A video input terminal 1 is adapted to receive the composite video signal, and is coupled to a selector switch 2 which is capable of being disposed in a "normal" recording condition or a "dubbing" recording condition, the latter being used to edit video signals. Selector switch 2 is schematically illustrated as having a normal contact N, a dubbing contact D and a movable contact which may be engaged with either the normal or dubbing contacts, as desired by the operator. Normal contact N is coupled to video input terminal 1, and dubbing contact D is coupled to an input terminal 30, the latter being referred to as a luminance input terminal to receive a luminance component, as will be described. The movable contact of selector switch 2 is coupled, in common, to the luminance channel, the chrominance channel and the control circuitry.

The luminance channel may be of conventional construction including a low pass filter 3, adapted to separate the luminance component from a composite video signal, which luminance component normally occupies a frequency range which is lower than that occupied by the normal chrominance component, and a frequency modulator 6 which is adapted to receive the separated luminance component, and to modulate a carrier of relatively higher frequency with the separated luminance component. An automatic gain control (AGC) circuit 5 supplies the separated luminance component to frequency modulator 6. The frequency-modulated luminance component produced at the output of frequency modulator 6 is supplied to a mixing circuit 9 through a high pass filter 7 and an amplifier 8. The mixing circuit is adapted to superimpose a frequency-converted chrominance component onto the frequency-modulated luminance component, as typically done in VTR's of this type. The output signal of mixing circuit 9 is a processed composite video signal, this signal being supplied to recording transducers, or heads 16a and 16b via a recording amplifier 15. It will be appreciated that heads 16a and 16b are rotatably driven by a suitable drive mechanism (not shown) to scan successive, adjacent tracks across the record medium. In the preferred embodiment, the record medium is a magnetic tape that is helically wrapped about a guide drum containing these heads, and the scanning of successive tracks results in the recording of video signals in the format schematically illustrated in FIG. 2.

The chrominance channel also may be of conventional construction and includes a band pass filter 4 coupled to selector switch 2, and being adapted to receive the composite video signal. Band pass filter 4 exhibits a filtering characteristic such that the chrominance component included in the composite video signal is separated therefrom. This separated chrominance component is supplied by the band pass filter to a frequency converter 11 via an automatic chrominance control (ACC) circuit 10.

Frequency converter 11, which may comprise a modulating circuit, is adapted to be supplied with a converting carrier signal and to modulate the separated chrominance component with this converting carrier signal. As is conventional, upper and lower side bands of the chrominance component are produced, the upper side band having a subcarrier whose frequency is equal to the sum of the normal chrominance subcarrier frequency and the converting carrier frequency, and the lower side band consisting of the chrominance component modulated onto a converted subcarrier whose frequency is equal to the difference between the normal chrominance subcarrier frequency and the converting carrier frequency. The lower side band is selected, such that frequency converter 11 produces the chrominance component modulated onto a relatively lower frequency subcarrier, this frequency-converted chrominance component thus occupying a relatively lower frequency range than it had occupied in the orignal, composite video signal. Low pass filter 12, coupled to the output of the frequency converter, aids in this selection of the lower side band of the frequency-converted chrominance component. The frequency-converted chrominance component then is supplied, via a selector switch 13 and an amplifier 14, to mixing circuit 9.

The converting carrier signal supplied to frequency converter 11 for the frequency conversion of the chrominance component to the relatively lower frequency range is generated by the combination of an oscillator 17, a frequency converter 19, a phase-splitting circuit 20 and a switching circuit 21. Preferably, oscillator 17 is a stable oscillating circuit, such as a quartz oscillator, adapted to generate a signal of predetermined frequency. If the illustrated apparatus is used to record an NTSC composite video signal, the frequency of the signal generated by oscillator 17 is equal to $(f_s - \frac{1}{4}f_h)$, wherein $f_s$ is the frequency of the normal chrominance subcarrier contained in the composite video signal and $f_h$ is the horizontal synchronizing frequency. This signal generated by oscillator 17 is supplied to frequency converter 19 wherein it is mixed, or modulated, with a signal supplied thereto by an automatic frequency control (AFC) circuit 18. The signal generated by AFC circuit 18 is synchronized with the horizontal synchronizing signal and, thus, follows any frequency changes which may be exhibited by the horizontal synchronizing signal. AFC circuit 18, which may be a conventional automatic frequency control circuit, generates a signal whose frequency is equal to a multiple of the horizontal synchronizing frequency. In the present example, AFC circuit 18 supplies a signal of frequency 44 $f_h$ to frequency converter 19.

The converting carrier signal generated by frequency converter 19 has a frequency equal to the upper side band of the resultant, modulated signal produced thereby. More particularly, the frequency of this converting carrier signal is equal to $[f_s + (44 - \frac{1}{4}) f_h]$ i.e., the sum of the frequencies supplied thereto.

Phase-splitting circuit 20 is illustrated herein as a transformer whose primary winding is coupled to frequency converter 19 to receive the converting carrier signal generated thereby, and whose secondary winding is provided with a center-tap coupled to a reference potential, such as ground. The upper and lower terminals of the secondary winding thus are provided with the converting carrier signal, but of opposite phases. For example, the phase of the converting carrier signal provided at the upper terminal of the secondary winding of transformer 20 exhibits the positive phase, and the converting carrier signal provided at the lower terminal of the secondary winding exhibits negative phase. The positive and negative phase of the converting carrier signal are supplied to respective contacts of switching circuit 21, this switching circuit being schematically illustrated herein as an electromechanical switch whose movable contact is selectively engageable with either of its fixed contacts to supply either the positive or negative phase of the converting carrier signal to frequency converter 11.

The particular phase of the converting carrier signal that is supplied by this switching circuit to the frequency converter is controlled by a phase control signal generated by a control signal generator 22. As one example thereof, the phase control signal may exhibit either a relatively higher voltage level or a relatively lower voltage level. When at its higher voltage level, the phase control signal controls switching circuit 21 to supply the positive phase of the converting carrier signal to frequency converter 11. Conversely, when the phase control signal exhibits its relatively lower level, switching circuit 21 supplies the negative phase of the converting carrier signal to the frequency converter.

Control signal generator 22 preferably includes a gating circuit adapted to receive a signal synchronized with the horizontal synchronizing signal, and another signal synchronized with the vertical synchronizing signal. These respective signals are supplied to the control signal generator by a synchronizing signal separator circuit 23. This synchronizing signal separator circuit, which may be of conventional construction, is adapted to separate the horizontal and vertical synchronizing signals from the composite video signal which is supplied by selector switch 2. The separated horizontal synchronizing signal is used to generate a pulse signal whose voltage level changes in response to each horizontal synchronizing signal. Thus, one signal which is supplied to control signal generator 22 exhibits a frequency equal to one-half the horizontal synchronizing frequency. Thus, this signal exhibits a relatively higher level when one line of the composite video signal is received, and a relatively lower level when the next-following line is received.

The separated vertical synchronizing signal is supplied to a divider circuit 24, this divider circuit being adapted to divide the frequency of the vertical synchronizing signal by one-half. The output of this divider circuit is coupled via a selector switch 25 to the other input of control signal generator 22 to supply a signal which exhibits a relatively higher voltage level when one field of the composite video signal is received, and a relatively lower voltage level when the next-following field is received. Thus, control signal generator 22 generates a phase control signal whose level alternates between higher and lower levels at each line interval when one field is received, and whose level remains at a relatively lower voltage level throughout the next-following field. Thus, during one field interval, the phase of the converting carrier signal that is supplied to frequency converter 11 changes over from the positive to the negative phase at the beginning of one line interval, and then returns from the negative to the positive phase as the next-following line interval during one field; and then, during the next-following field, the phase of the converting carrier signal remains fixed. As a result, the phase of the subcarrier of the frequency-converted chrominance component produced at the output of frequency converter 11 remains constant during the first-mentioned field interval, and alternates between positive and negative phase during the next-following field interval, resulting in the recording of the frequency-converted chrominance component having the phase relationship illustrated in FIG. 2. That is, head 16a scans track $T_a$ during the first-mentioned field interval, that is, during the field interval that switching circuit 21 alternately supplies positive and negative phases of the converting carrier signal to frequency converter 11; and head 16b scans track $T_b$ during the next-following field interval.

The signal supplied to control signal generator 22 by frequency divider 24 also is used as an identifying signal and is recorded in a longitudinal track along tape T. This signal is supplied to a control signal recording head 27 via an amplifier 26 to record these identifying, or control, signals. It is appreciated that such control signals serve to identify tracks $T_a$ and $T_b$, respectively. That is, and in accordance with the example described above, when this control signal exhibits its relatively higher level, track $T_a$ is recorded; and when this control signal exhibits its relatively lower level, track $T_b$ is recorded.

This control signal derived from frequency divider 24 also is used in a servo-system for regulating the rotary scanning motion of heads 16a and 16b relative to tape T. This servo-system includes a phase comparator 28 and a drum servo arrangement 29, the latter being used to rotatably drive the heads. It may be appreciated that, when head 16a, for example, rotates to a predetermined position, a suitable indicating pulse is generated. This indicating pulse is compared in phase comparator 28 with the control signal supplied thereto from frequency divider 24. Any phase difference between these signals is supplied by the phase comparator as an error signal to drum servo arrangement 29. This error signal is used to modify the rotation of heads 16a and 16b such that these heads rotate into initial contact with tape T to commence the scanning of the respective tracks $T_a$ and $T_b$ at the proper times during successive field intervals. For example, head 16a is adapted to begin its scan of track $T_a$ at the beginning of a field interval.

Selector switches 13 and 25 each may be similar to aforedescribed selector switch 2, and each includes a normal contact N and a dubbing contact D, together with a movable contact that is selectively engageable with either of these normal and dubbing contacts. Normal contact N of selector switch 13 is coupled to low pass filter 12 to receive the frequency-converted chrominance component, described above. Dubbing contact D is coupled to a chrominance input terminal 31 to receive a chrominance component that already is frequency-converted, as will be described. Depending upon the switching condition of selector switch 13, either the frequency-converted chrominance component supplied by low pass filter 12 or the frequency-converted chrominance component supplied to chrominance input terminal 31 is coupled to mixing circuit 9 by selector switch 13.

Normal contact N of selector switch 25 is coupled to frequency divider 24, and dubbing contact D thereof is coupled to a control signal input terminal 32. This control signal input terminal is adapted to receive a control signal of the type provided by frequency divider 24. As will be explained below, the control signal which is supplied to control signal input terminal 32 is derived from another VTR which operates in its reproducing mode. Depending upon the switching condition of selector switch 25, either the control signal produced by frequency divider 24, or the control signal received by control signal input terminal 32, is coupled to control signal generator 22, and also to amplifier 26 and phase comparator 28.

When selector switches 2, 13 and 25 exhibit their "normal" switching conditions, the movable contact of each selector switch engages its normal contact N. In this arrangement, the composite video signal supplied to video input terminal 1 is applied, in common, to the luminance channel, the chrominance channel and synchronizing signal separator circuit 23. Low pass filter 3 extracts the luminance component from the composite video signal, and this extracted luminance component modulates the frequency of a relatively higher frequency carrier in frequency modulator 6. The resultant frequency-modulated luminance component is supplied to mixing circuit 9.

Band pass filter 4 in the chrominance channel extracts the chrominance component from the composite video signal, and this chrominance component is frequency-converted to a relatively lower frequency range by frequency converter 11. The phase relationship of the frequency-converted chrominance subcarrier is modified in the manner described above, such that the frequency-converted chrominance component is recorded in successive tracks with the phase relationship illustrated in FIG. 2. Thus, the frequency-converted chrominance component in adjacent tracks exhibits the aforementioned frequency interleaved relationship.

Synchronizing signal separator circuit 23 separates the horizontal and vertical synchronizing signals from the received composite video signal to control control signal generator 22, in the manner described above. Also, the separated vertical synchronizing signal is used to produce the aforedescribed control signal that is recorded by control head 27, and that also is used to control drum servo arrangement 29. Thus, in the "normal" mode, or condition, the recording apparatus illustrated in FIG. 3 operates in the manner known to those of ordinary skill in the art.

When the apparatus of FIG. 3 is disposed in its dubbing mode, that is, selector switches 2, 13 and 25 exhibit their dubbing conditions, the respective movable contacts thereof each engages its dubbing contact D. Thus, the luminance channel now is coupled to luminance input terminal 30 to receive a luminance component; the chrominance channel is, effectively by-passed and amplifier 14 is supplied directly with a frequency-converted chrominance component applied to chrominance input terminal 31; and frequency divider 24 likewise is similarly by-passed, such that amplifier 26 and phase comparator 28 are supplied with a control signal applied to control signal input terminal 32. The various signals which are applied to input terminals 30-32 are derived from the reproducing section of a similar VTR, which signals are adapted to be edited onto tape T. The reproducing apparatus, or section, of such a VTR now will be described.

Figure 4:
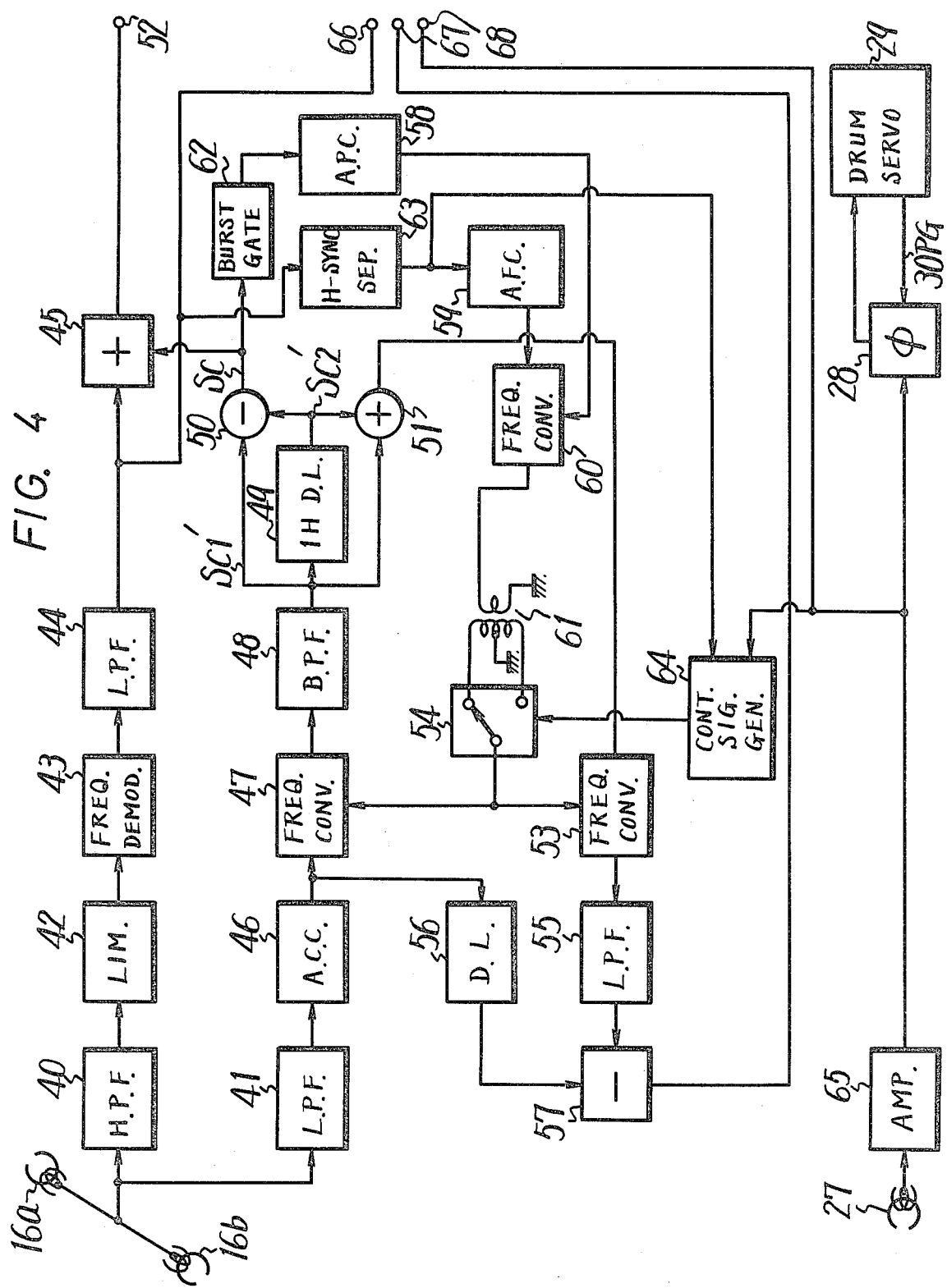
FIG. 4 is a block diagram of reproducing apparatus employing one embodiment of this invention.

Turning now to FIG. 4, there is illustrated a block diagram of one embodiment of the present invention which can be used in the reproducing section of a VTR, this apparatus including a luminance channel for recovering the luminance component from the video signal which is recorded by the apparatus shown, for example, in FIG. 3, a chrominance channel for recovering the chrominance component, and control circuitry. The reproducing apparatus includes two rotary scanning transducers, or heads, which may be the very same heads that are provided in the recording apparatus of FIG. 3. Thus, in FIG. 4, these reproducing heads are identified as heads 16a and 16b, respectively. These heads are rotatably driven so as to scan successive skewed tracks across tape T, for example, heads 16a and 16b scan tracks $T_a$ and $T_b$, respectively. It is appreciated that, when a head scans its associated record track, the video signals reproduced thereby exhibit the frequency spectrum shown in FIG. 1. More particularly, the reproduced video signals include a frequency-modulated luminance component, occupying a relatively higher frequency range, and a frequency-converted chrominance component, occupying a relatively lower frequency range. The luminance channel is adapted to extract the frequency-modulated luminance component from the reproduced video signals, and to demodulate this component so as to return it to its original frequency range. Similarly, the chrominance component is adapted to extract the frequency-converted chrominance component from the reproduced video signals and to frequency re-convert this component back to its original frequency range. As will be described, the chrominance channel also includes circuitry which eliminates cross talk components that may be picked up by, for example, head 16a from adjacent track $T_b$ when that head scans track $T_a$.

The luminance channel includes a high pass filter 40 coupled to heads 16a and 16b, and having a filtering characteristic so as to extract the frequency-modulated luminance component from the reproduced video signals. Since the frequency-modulated luminance component occupies a relatively higher frequency range, this component is capable of passing through the high pass filter. A limiter circuit 42, adapted to cancel undesired amplitude modulations in the filtered frequency-modulated luminance component, supplies this component to a frequency demodulator 43. The frequency demodulator serves to demodulate the frequency-modulated signal so as to recover the original luminance component therefrom. This recovered luminance component is supplied through low pass filter 44, which serves to eliminate higher frequency noise components, and then is applied to a mixing circuit 45. The recovered luminance component also is supplied to a luminance output terminal 66.

The chrominance channel includes a low pass filter 41 coupled to heads 16a and 16b to extract the frequency-converted chrominance component from the reproduced video signals. It is appreciated that the filtering characteristic of low pass filter 41 corresponds to the relatively lower frequency range of the frequency-converted chrominance component and, thus, adequately extracts this component from the video signals. The extracted frequency-converted chrominance component is supplied to a frequency re-converter 47 via an automatic chrominance control (ACC) circuit 46.

Frequency re-converter 47 is supplied with a reconverting carrier signal and serves to modulate, or mix, the frequency-converted chrominance component with this re-converting carrier signal to return the frequency-converted chrominance subcarrier to its original frequency. More particularly, the mixing of the frequency-converted chrominance component and the re-converting carrier signal results in upper and lower side bands, and the upper side band is selected, with the assistance of a band pass filter 48, to restore the chrominance component back to its original frequency range. The recovered chrominance component is supplied by band pass filter 48 to a comb filter which exhibits attenuating, or null points at those frequencies which correspond to the major frequencies of the cross talk components which accompanied the reproduced frequency-converted chrominance component. As is appreciated by those of ordinary skill in the art, and as is described in the aforementioned patents, the frequency interleaved relationship of the frequency-converted chrominance components recorded in adjacent tracks $T_a$ and $T_b$ enables the suppression of cross talk components by use of this comb filter.

In the embodiment illustrated in FIG. 4, the comb filter is comprised of a delay circuit 49 and a subtracting circuit 50. Delay circuit 49 may comprise a delay line exhibiting a delay time corresponding to one horizontal line interval. Thus, for purpose of the present discussion, delay circuit 49 is referred to herein as a 1H delay line. It is, therefore, appreciated that the output of 1H delay line 49 is the recovered chrominance component of the preceding line. The undelayed, recovered chrominance component produced at the output of band pass filter 48 is identified as $S'_{c1}$, and is supplied to one input of subtracting circuit 50. The delayed, recovered chrominance component, produced at the output of 1H delay line 49, is identified as $S'_{c2}$, and is supplied to the other input of subtracting circuit 50. The delayed chrominance component is subtracted from the undelayed chrominance component, resulting in a recovered chrominance component $S_c$ which is substantially free of cross talk components. This cross talk free chrominance component $S_c$ is supplied to mixing circuit 45, whereat it is combined with the recovered luminance component to produce the original composite video signal. This reproduced composite video signal, whose luminance and chrominance components occupy their original frequency ranges, is supplied to an output terminal 52 and may be used to reproduce a corresponding video picture.

The recovered, cross talk free chrominance component $S_c$ also is supplied to a burst gate 62 which functions to extract the frequency re-converted burst signal therefrom. This burst signal is applied to an automatic phase control (APC) circuit 58 which, in turn, generates a first oscillating signal synchronized with the phase of the extracted burst signal and, preferably, exhibiting a frequency of $(f_s - \frac{1}{4}f_h)$. It is seen that the oscillating signal generated by APC circuit 58 has a frequency equal to the frequency generated by oscillator 17 in the recording apparatus shown in FIG. 3. This oscillating signal is supplied to a frequency converter 60.

The recovered luminance component, which includes the horizontal and vertical synchronizing signals, is supplied to a horizontal synchronizing signal separator circuit 63. This circuit is adapted to separate the horizontal synchronizing signal from the recovered luminance component. The separated horizontal synchronizing signal is applied to an automatic frequency control (AFC) circuit 59 which, for example, may be substantially similar to aforedescribed AFC circuit 18, shown in the recording apparatus of FIG. 3. AFC circuit 59 functions to generate another oscillating signal whose frequency is equal to $44f_h$. This oscillating signal also is supplied to frequency converter 60, wherein it is mixed, or modulated, with the oscillating signal supplied by APC circuit 58 to generate a re-converting carrier signal whose frequency is equal to the sum of the frequencies supplied thereto. More particularly, frequency converter 60 generates a re-converting carrier signal whose frequency is equal to $[f_h+(44-\frac{1}{4}) f_h]$, similar to the frequency of the converting carrier signal generated by frequency converter 19 in the recording apparatus shown in FIG. 3. It is appreciated that, since APC circuit 58 generates the first-mentioned operating signal, and since AFC circuit 59 generates the second-mentioned oscillating signal, any time base errors which may be present in the reproduced composite video signal, that is, any frequency or phase shifts in the burst and horizontal synchronizing signals, are present in the re-converting carrier signal generated by frequency converter 60. It is appreciated that, since this re-converting carrier signal is used to frequency re-convert the reproduced chrominance component, any time base errors which may be present in the reproduced chrominance component are cancelled.

It may be appreciated that, in order to re-convert the chrominance component back to its original state, the phase of the re-converting carrier signal generated by frequency converter 60 must be modified in the same manner as the phase of the converting carrier signal generated by frequency converter 19 in the recording apparatus of FIG. 3. This phase modulation is attained by a phase splitting circuit 61, shown as a transformer, and a switching circuit 54. Phase-splitting circuit 61 is similar to aforedescribed phase-splitting circuit 20 and, therefore, in the interest of brevity, is not further described. Similarly, switching circuit 54 is analogous to aforedescribed switching circuit 21. A control signal generator 64, similar to aforedescribed control signal generator 22, is adapted to generate a phase control signal, which signal controls the switching state of switching circuit 54. Thus, when head 16a scans track $T_a$ to reproduce the video signals recorded therein, switching circuit 54 operates to change over the phase of the reconverting carrier signal generated by frequency converter 60 from its positive phase to its negative phase, and then back again, at successive line intervals. When head 16b scans track $T_b$, the phase control signal is such that switching circuit 54 supplies the reconverting carrier signal to frequency converter 47 with constant phase.

Control signal generator 64 is supplied with the horizontal synchronizing signal separated from the luminance component by horizontal synchronizing separator 63; and also is supplied with a reproduced control signal, this control signal being reproduced from the control signal track by head 27. The reproduced control signal is supplied to the control signal generator by an amplifier 65. The reproduced control signal also is supplied to phase detector 28 which cooperates with drum servo arrangement 29 in the manner described above. Thus, the reproduced control signal, taken in combination with the phase comparator and drum servo arrangement, insure that the same heads which were used to record the video signals in each track also reproduce those signals. That is, the movement of heads 16a and 16b is controlled so that head 16a scans tracks $T_a$ and head 16b scans tracks $T_b$.

The operation of the reproducing apparatus which has, thus far, been described, is similar to that explained in the aforementioned patents. Thus, as heads 16a and 16b scan tracks $T_a$ and $T_b$, respectively, the luminance channel extracts the reproduced luminance component and frequency demodulates this component so as to recover the original luminance signals. Also, the chrominance channel recovers the original chrominance components from each scanned track.

It is appreciated that, when track $T_a$ is scanned, the frequency-converted chrominance component recorded in track $T_a$ is reproduced, together with an accompanying cross talk component picked up from the adjacent track $T_b$. As mentioned above, the phenomenon of azimuth loss serves to eliminate cross talk interference in the luminance component. However, such azimuth loss does not eliminate cross talk interference in the chrominance component. Nevertheless, since the picked up cross talk components exhibit a frequency interleaved relationship with respect to the primary chrominance components, the comb filter comprised of 1H delay line 49 and subtracting circuit 50 functions to eliminate such cross talk interference. The manner in which this is achieved now will be briefly described, with reference to the schematic representation shown in FIG. 2. Let it be assumed that track $T_a$ is scanned. Let it be further assumed that head 16a now reproduces the second horizontal line interval shown in track $T_a$. It is appreciated that, when track $T_a$ is scanned, the phase of the re-converting carrier signal supplied to frequency converter 47 is inverted at the beginning of each successive line interval. Thus, the phase of the frequency re-converted chrominance component now produced at the output of frequency converter 47 is opposite to the phase of the frequency-reconverted chrominance component which was reproduced from the preceding line interval. However, because of 1H delay line 49, this frequency re-converted chrominance component of the preceding line interval is now supplied to subtracting circuit 50 as the delayed chrominance component $S'_{c2}$. The undelayed chrominance component $S'_{c1}$ is supplied to the other input of subtracting circuit 50.

In addition to these chrominance components, a delayed cross talk component, picked up from adjacent track $T_b$, is included in chrominance component $S'_{c2}$ and is supplied to one input of subtracting circuit 50 by 1H line 49. Similarly, the cross talk component picked up from track $T_b$ is included in chrominance component $S'_{c1}$ and is supplied to the other input of this subtracting circuit. From FIG. 2, it is seen that the phase of the cross talk component picked up from track $T_b$ when the first line interval of track $T_a$ is scanned is opposite from the phase of the cross talk component picked up when the second line interval is scanned. By reason of the inversion in the phase of the re-converting carrier signal supplied to frequency converter 47 at each line interval, this frequency converter serves to re-convert the picked up cross talk components as well as the primary chrominance components. Now, however, although the reproduced cross talk components exhibited opposite phases, the phase inversion of the re-converting carrier results in frequency re-converted cross talk components exhibiting the same phase.

When the primary chrominance components of opposite phases are supplied to subtracting circuit 50, the output $S_c$ of this subtracting circuit appears as a reinforced primary chrominance component. However, inasmuch as the phases of the respective cross talk components which are supplied to the subtracting circuit are equal, the subtracting operation serves to cancel them, thus eliminating the cross talk components from the output of chrominance component $S_c$. It may be appreciated that, since the information content of adjacent line intervals is highly redundant, there is little, if any, loss or degradation when the chrominance components of adjacent line intervals are combined. Thus, the comb filter comprised of 1H delay line 49 and subtracting circuit 50 serves to eliminate the undesired cross talk component which accompanies each reproduced frequency-converted chrominance component.

It is appreciated that, when the next line interval of track $T_a$ is scanned, the foregoing operation is repeated; and the accompanying cross talk component which is picked up from track $T_b$ during the scanning of this line interval is eliminated.

A similar cross talk suppression operation is carried out when track $T_b$ is scanned. It is appreciated that, during the scanning of track $T_b$, the phase of the re-converting carrier signal remains constant. Thus, when the first line interval of this track is scanned, the phase of the primary chrominance component reproduced therefrom is opposite to the phase of the primary chrominance component which is reproduced when the second line interval is scanned. However, since the phase of the frequency-converted chrominance component recorded in track $T_a$ remains the same from one line interval to the next, the phase of the picked up cross talk component during the scanning of the first line interval of track $T_b$ is equal to the phase of the cross talk component picked up when the second line interval of this track is scanned. Subtracting circuit 50 serves to cancel these cross talk components of the same phase. However, the primary chrominance components of opposite phase are reinforced. Thus, during the scanning of track $T_b$, the recovered chrominance component $S_c$ is substantially free of cross talk interference.

Although the chrominance component $S_c$ is free of cross talk interference, it is seen that, if this chrominance component is to be transferred to a second record medium, as by the recording apparatus shown in FIG. 3, it is necessary to frequency convert this component once again. The present invention avoids this requirement of frequency conversion during the dubbing, or editing operation. In accordance with the apparatus shown in FIG. 4, the reproduced frequency-converted chrominance component provided at the output of ACC circuit 46, and which is accompanied by cross talk interference, has its accompanying cross talk components removed therefrom so that the frequency-converted chrominance component can be supplied directly to mixing circuit 9 (FIG. 3). The removal of the cross talk components which accompany the reproduced frequency-converted chrominance component is obtained by extracting, or separating, the cross talk component from the frequency re-converted chrominance component, and then subtracting this separated cross talk component from the reproduced frequency-converted chrominance component so as to cancel the cross talk component therefrom. The cross talk component is extracted from the frequency re-converted chrominance component by a modified comb filter, formed of the very same 1H delay line 49 and an adding circuit 51. Then, this extracted cross talk component is frequency-converted back to its original frequency range, that is, the frequency range which accompanies the reproduced frequency-converted chrominance component, by a frequency converter 53. Then, once the cross talk component has been turned to the same frequency range as the primary frequency-converted chrominance component, it is subtracted from the latter component by a subtracting circuit 57.

Frequency converter 53, in addition to being supplied with the extracted cross talk component, also is supplied with the re-converting carrier signal that is produced at the output of switching circuit 54. Thus, frequency converter 53 operates in a manner which is similar to the operation of aforedescribed frequency converter 11, used in the recording apparatus of FIG. 3. A low pass filter 55 couples the frequency-converted cross talk component to subtracting circuit 57, whereat it is subtracted from the reproduced frequency-converted chrominance component. A delay line 56, which is adapted to account for the inherent delay in frequency converter 47, band pass filter 48 and the comb filter, supplies the reproduced frequency-converted chrominance component to subtracting circuit 57. The output of this subtracting circuit, which appears as a frequency-converted chrominance component that is substantially free of undesired cross talk components, is supplied to a chrominance output terminal 67.

It may be appreciated that, since the phases of the primary chrominance components produced at the outputs of band pass filter 48 and 1H delay line 49, respectively, are opposite to each other, but the phases of the cross talk chrominance components at the outputs of the band pass filter and 1H delay line are equal to each other, subtracting circuit 50 serves to reinforce the primary chrominance components and cancel the cross talk chrominance components. However, adding circuit 51 operates with these very same phase relationships so as to the cancel the primary chrominance components yet reinforce the cross talk chrominance components. Hence, adding circuit 51 supplies frequency converter 53 with the extracted frequency re-converted cross talk component. Once converted down to the frequency range that is compatible, or equal, to the frequency range of the reproduced frequency-converted chrominance component, the extracted cross talk component serves to cancel the cross talk component which accompanies the reproduced frequency-converted chrominance component. Thus, subtracting circuit 57 supplies chrominance output terminal 67 with a cross talk free frequency-converted chrominance component.

It may be appreciated that luminance output terminal 66 may be connected to luminance input terminal 30 (FIG. 3), chrominance output terminal 67 may be connected to chrominance input terminal 31 and control signal output terminal 68 may be connected to control signal input terminal 32. Consequently, in the editing, or dubbing mode, the recovered luminance component, reproduced by the luminance channel of the reproducing apparatus shown in FIG. 4, is supplied to the luminance channel of the recording apparatus, wherein it is frequency-modulated to its higher frequency range. Also, the frequency-converted chrominance component, whose cross talk interference is removed therefrom, is supplied directly to mixing circuit 9, via amplifier 14, wherein it is mixed with the frequency-modulated luminance component. Hence, mixing circuit 9 supplies the processed composite video signal to heads 16a and 16b for re-recording. Also, the control signal which is reproduced from the record medium by head 27 (FIG. 4) is supplied, via amplifier 26, to the control signal recording head 27 (FIG. 3) in the recording apparatus.

In the aforedescribed operation of the recording and reproducing apparatus, it has been assumed that, to establish the frequency interleaved relationship of the chrominance subcarrier in adjacent lines, the phase of this subcarrier is inverted, or reversed, from one line to the next, in alternate tracks. However, a similar frequency interleaved relationship can be obtained if the phase of the chrominance subcarrier is shifted by 90° in one direction, at successive line intervals in one track, and then is shifted by 90° in the opposite direction in successive line intervals in the next adjacent track.

When the apparatus shown in FIG. 4 is coupled to the apparatus shown in FIG. 3, a 3-wire connector is needed in order to couple output terminals 66, 67 and 68 to input terminals 30, 31 and 32, respectively. In a modified embodiment of the present invention, control signal output terminal 68 may be omitted, such that the control signal which is produced from one record medium need not be re-recorded, or transferred, onto the second record medium. The reproducing apparatus of such a modified embodiment is illustrated in FIG. 5, now to be described.

Figure 5:
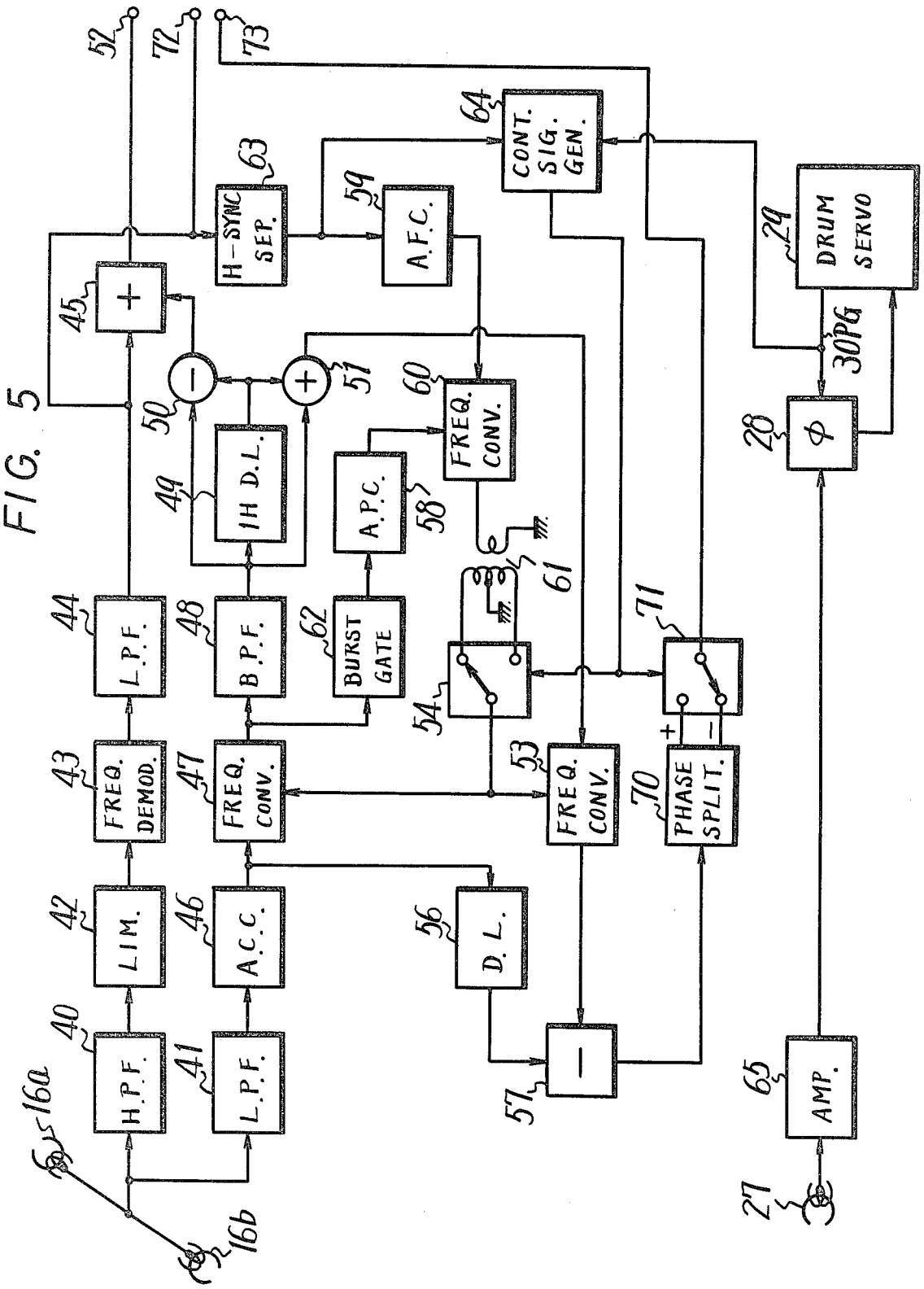
FIG. 5 is a block diagram of reproducing apparatus employing another embodiment of the present invention.

The FIG. 5 embodiment is comprised of a luminance channel which, as is seen, is substantially similar to the luminance channel of the embodiment shown in FIG. 4, a chrominance channel, which also is substantially similar to the chrominance channel of the embodiment shown in FIG. 4, and control circuitry. In view of the substantial similarities between these embodiments, only the differences therebetween will be explained. Whereas, in the embodiment of FIG. 4, burst gate 62 extracts the burst signal from the recovered, cross talk free chrominance component $S_c$, burst gate 62 is connected, in FIG. 5, to the output of frequency converter 47. Thus, in the FIG. 5 embodiment, the burst signal is extracted from the recovered chrominance component, but prior to the removal of cross talk components therefrom, that is, prior to passing this recovered chrominance component through the comb filter. This difference in the embodiment of FIG. 5 merely is a matter of design and forms no part of the present invention per se.

Another difference between the embodiments shown in FIG. 4 and FIG. 5 is that, in FIG. 5, the recovered, cross talk free, frequency-converted chrominance component produced at the output of subtracting circuit 57 is supplied to a phase splitting circuit 70, the output of which is coupled to the chrominance output terminal (identified herein by reference numeral 73) via a change-over switch 71. Phase splitting circuit 70 may be similar to phase splitting circuit 61 or, alternatively, may comprise any other conventional phase splitting circuit which is provided with a pair of output terminals at which oppositely-phased cross talk free, frequency-converted chrominance components are provided. That is, and as indicated in FIG. 5, the upper output terminal of phase splitting circuit 70 provides an in-phase frequency-converted chrominance component, that is, the phase of this frequency-converted chrominance component is equal to the phase of the frequency-converted chrominance component produced at the output of subtracting circuit 57, and the lower output terminal of phase splitting circuit 70 is provided with an out-of-phase (e.g. 180°) version of the frequency-converted chrominance component.

Change-over switch 71 may be similar to switching circuit 54 and is supplied with the phase control signal produced by control signal generator 64. Depending upon the voltage level exhibited by this phase control signal, change-over switch 71 selects either the in-phase or out-of-phase version of the frequency-converted chrominance component, as provided at the respective outputs of phase splitting circuit 70. Thus, when the phase of the re-converting carrier signal supplied to frequency re-converter 47 by switching circuit 54 remains constant, change-over switch 71 likewise selects a constant phase of the cross talk free, frequency-converted chrominance component from one or the other of the output terminals of phase splitting circuit 70. When the phase of the re-converting carrier signal supplied to frequency re-converter 47 is inverted at the beginning of each line interval during, for example, the scanning of the next adjacent track, change-over switch 71 likewise alternately selects the in-phase and then the out-of-phase version of the cross talk free, frequency-converted chrominance component. Thus, chrominance output terminal 73 is supplied with cross talk free, frequency-converted chrominance components of proper phase at each line interval when each successive track is scanned.

It is appreciated that, in the embodiment of FIG. 5, since the combination of phase splitting circuit 70 and change-over switch 71 produces the proper phase of the cross talk free, frequency-converted chrominance component in each reproduced line interval, there is no need to supply the control signal, reproduced from the control track by control signal head 27, to the VTR recording section that might be coupled to the illustrated reproducing apparatus. Thus, control signal output terminal 68, of FIG. 4, is omitted from the output terminals of FIG. 5. This means that only luminance output terminal 72 and chrominance output terminal 73 are necessary. Hence, in the FIG. 5 embodiment, a 2-wire connector may be used to couple the recovered luminance and frequency-converted chrominance components to recording apparatus.

Yet another difference between the embodiments shown in FIGS. 4 and 5 is that control signal generator 64 in FIG. 5 is not supplied with the reproduced control signal. Rather, since drum servo arrangement 29 operates to insure that the rotation of heads 16a and 16b is the synchronism with the reproduced control signal, the normal position pulses which are generated in the drum servo arrangement when the heads rotate into predetermined position, which position pulses are synchronized with the reproduced control pulses, are supplied to the control signal generator. Nevertheless, since these position pulses are synchronized with the reproduced control pulses, control signal generator 64 (FIG. 5) operates in response to these position pulses in substantially the same way as the control signal generator (FIG. 4) operates in response to the reproduced control signal.

Figure 6:
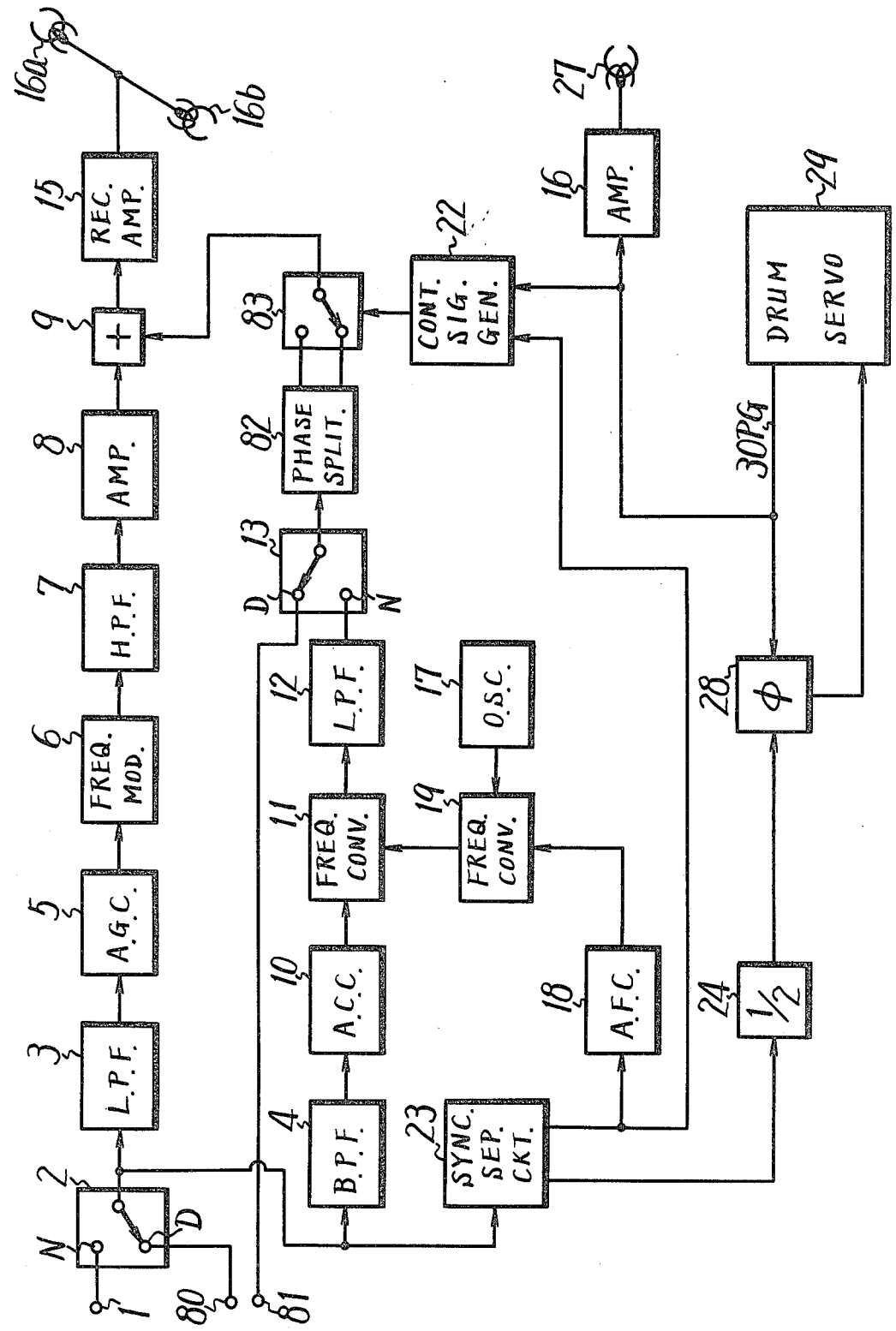
FIG. 6 is a block diagram of recording apparatus which can be used with the apparatus shown in FIG. 5.

An embodiment of recording apparatus which is compatible with the reproducing apparatus shown in FIG. 5, is illustrated in FIG. 6. This FIG. 6 embodiment is similar, in most respects, to the embodiment discussed above with respect to FIG. 3. Accordingly, only the differences between these embodiments are discussed herein.

The recording apparatus of FIG. 6 is provided with a luminance channel, which is substantially similar to the luminance channel shown in FIG. 3, and also with a chrominance channel for frequency-converting a chrominance component, separated from an original composite video signal, to a relatively lower frequency range, together with control circuitry for controlling this frequency conversion operation. Also, the recording apparatus of FIG. 6 is provided with selector switches 2 and 13 having normal switching conditions, which are adopted when an original, composite video signal is to be recorded, and dubbing conditions, which are adopted when the video signal reproduced by the apparatus shown in FIG. 5 is to be recorded. Accordingly, the recording apparatus of FIG. 6 is provided with a luminance input terminal 80, adapted to be connected to luminance output terminal 72 of the FIG. 5 reproducing apparatus, and a chrominance input terminal 81, adapted to be connected to chrominance output terminal 73 of the reproducing apparatus.

In FIG. 6, the converting carrier supplied to frequency converter 11 is derived directly from the output of frequency converter 19. Thus, in this embodiment, phase splitting circuit 20 and switching circuit 21 are omitted. Consequently, the phase of the frequency-converted chrominance component produced at the output of frequency converter 11 is the same phase as was exhibited by the original chrominance component prior to the frequency conversion thereof. More particularly, whereas the frequency-converted chrominance component produced at the output of frequency converter 11 in FIG. 3 exhibits a substantially constant phase from one line interval to the next during one field interval, that is, while one track is being scanned, and exhibits an alternating phase from one line interval to the next during the next-following field interval, the frequency-converted chrominance component produced at the output of frequency converter 11 of FIG. 6 exhibits its original phase, that is, the phase of the converted chrominance subcarrier is inverted in successive lines for all field intervals.

In FIG. 6, the frequency-converted chrominance component, exhibiting its original phase relationship, is supplied by selector switch 13, when the latter is disposed in its normal switching condition, to a phase splitter 82. Phase splitter 82 is substantially similar to aforedescribed phase splitter 70 and is provided with a pair of output terminals at which are produced oppositely-phased frequency-converted chrominance components. These oppositely-phased frequency-converted chrominance components are supplied to respective inputs of a change-over switch 83. This change-over switch may be similar to aforedescribed change-over switch 71, and is supplied with the phase control signal produced by control signal generator 22. That is, change-over switch 83 is supplied with the same phase control signal that was used in the FIG. 3 embodiment to control switching circuit 21. Consequently, and as is appreciated, the switching operation of change-over switch 83 in FIG. 6 is substantially the same as the switching operation of switching circuit 21 in FIG. 3. Hence, when, for example, track $T_a$ is scanned by head 16a, control signal generator 22 supplies a phase control signal to change-over switch 83, the level of which alternates between higher and lower voltage levels at successive line intervals. Thus, change-over switch 83 selects alternating phases of the frequency-converted chrominance component, as produced at the respective outputs of phase splitter 82. As a result of this switching operation, head 16a records a constant phase frequency-converted chrominance component throughout the successive line intervals in track $T_a$, as shown in FIG. 2.

When head 16b scans track $T_b$, the signal level of the phase control signal supplied to change-over switch 83 by control signal generator 22 remains constant from one line interval to the next. Accordingly, during the scanning of track $T_b$, change-over switch 83 does not select alternate phases of the frequency-converted chrominance component as provided at the respective output terminals of phase splitter 82. As a result thereof, the original phase relationship of the chrominance component, from one line to the next, is maintained. Therefore, the frequency-converted chrominance component recorded in track $T_b$ exhibits the alternating phase shown in FIG. 2.

Thus, it is seen that, in its normal recording mode, the apparatus shown in FIG. 6 records the frequency-converted chrominance component having the desired frequency interleaved relationship, similar to the recorded frequency-converted chrominance component attained by the apparatus shown in FIG. 3.

When the apparatus shown in FIG. 6 is disposed in its dubbing mode, the cross talk free, frequency-converted chrominance component produced at chrominance output terminal 73 by the reproducing apparatus of FIG. 5 is supplied to chrominance input terminal 81, and then, via selector switch 13, to phase splitter 82. Phase splitter 82 and change-over switch 83 complement phase splitter 70 and change-over switch 71 so as to record the cross talk free, frequency-converted chrominance component in tracks $T_a$ and $T_b$ having the desired phase relationship illustrated in FIG. 2. For example, if, in the reproducing apparatus, the cross talk free, frequency-converted chrominance component supplied to chrominance output terminal 73 exhibits alternating phase from one line interval to the next for all field intervals, phase splitter 82 and change-over switch 83 operate to invert the phase of the frequency-converted chrominance component at alternate line intervals during the scanning of tracks $T_a$, but maintain the received alternating phase relationship during the recording of tracks $T_b$. Hence, the phase relationship illustrated in FIG. 2 is recorded. Alternatively, if the cross talk free frequency-converted chrominance component supplied to chrominance output terminal 73 exhibits a constant phase throughout all line intervals in each field interval, phase splitter 82 and change-over switch 83 operate to maintain this constant phase during the recording of tracks $T_a$, and to invert the phase of the frequency-converted chrominance component at the beginning of successive line intervals during the recording of tracks $T_b$. As a result, the phase relationship illustrated in FIG. 2 is recorded.

In the FIG. 6 embodiment, it is appreciated that control signal generator 22 is not supplied with the control signal produced by frequency divider 24 during the normal recording mode, nor is the control signal generator supplied with a control signal reproduced from the control track by the reproducing apparatus of FIG. 5. Rather, the position pulses which are produced by drum servo arrangement 29, discussed above with respect to the reproducing apparatus of FIG. 5, are supplied to the control signal generator. Furthermore, since these position pulses are synchronized with the vertical synchronizing signal that is separated from the luminance component by synchronizing signal separator circuit 23, during both the normal and dubbing modes, it is sufficient to record these position pulses as the control signal in the control track along tape T. Accordingly, selector switch 25, provided in the embodiment of FIG. 3, is not needed in the embodiment of FIG. 6.

Thus, it is seen that, in the modified embodiments shown in FIGS. 5 and 6, the dubbing operation can be carried out without requiring frequency re-conversion and then subsequent frequency conversion of the chrominance component, provided the reproducing apparatus is compatible with the recording apparatus. If, however, the composite video signal is reproduced by a different reproducing system, then the reproduced composite video signal is re-recorded by the recording apparatus shown in FIG. 6 when the latter is disposed in its normal mode.

While the present invention has been particularly shown and described with reference to certain preferred embodiments, it will be appreciated by those of ordinary skill in the art that various changes and modifications in form and details may be made without departing from the spirit and scope of the invention. It is intended that the appended claims be interpreted as including all such changes and modifications.

What is claimed is:

1. Apparatus for recovering a frequency-converted chrominance component, substantially free of cross-talk components, from a composite video signal reproduced from successive record tracks on a record medium, the composite video signal in adjacent tracks having frequency-converted chrominance components whose chrominance carriers exhibit a frequency interleaved relationship with respect to each other, said apparatus comprising reproducing means for reproducing at least the frequency-converted chrominance component from respective tracks, together with an accompanying cross-talk component picked up from an adjacent track; cross-talk separating means, including comb filter means, coupled to said reproducing means for separating the cross-talk component from the reproduced frequency-converted chrominance component; combining means for combining said separated cross-talk component and said reproduced frequency-converted chrominance component to produce a frequency-converted chrominance component substantially free of cross-talk components; and an output terminal coupled to said combining means for receiving the cross-talk free frequency-converted chrominance component and for supplying said cross-talk free frequency-converted chrominance component to further means.

2. The apparatus of claim 1 wherein said frequency-converted chrominance component has a chrominance subcarrier whose frequency has been converted from an original frequency condition to a converted frequency condition, and wherein said cross-talk separating means includes frequency re-conversion means for re-converting said reproduced frequency-converted chrominance component and accompanying cross-talk component back to the original chrominance subcarrier frequency condition; and means for supplying the frequency re-converted chrominance component and accompanying cross-talk component to said comb filter means.

3. The apparatus of claim 2 wherein said comb filter means separates a frequency re-converted cross-talk component from the frequency re-converted chrominance component; and wherein said combining means comprises frequency conversion means for converting the frequency re-converted cross-talk component to a frequency range corresponding to the frequency range of said reproduced frequency-converted chrominance component.

4. The apparatus of claim 3 wherein said combining means further comprises subtracting means coupled to said reproducing means and to said frequency conversion means for receiving the reproduced frequency-converted chrominance component and the frequency-converted cross-talk component, respectively, to subtract the frequency-converted cross-talk component from the reproduced frequency-converted chrominance component, thereby substantially removing the accompanying cross-talk component from the reproduced frequency-converted chrominance component.

5. The apparatus of claim 4 wherein the frequency-converted chrominance component recorded in one track has a chrominance carrier of constant phase in successive line intervals and the frequency-converted chrominance component recorded in the next adjacent track has a chrominance carrier whose phase is inverted at each successive line interval; and wherein said frequency re-conversion means comprises a source of re-converting carrier, phase inversion means for selectively inverting the phase of said re-converting carrier, phase control means for controlling said phase inversion means to maintain the phase of said re-converting carrier constant when said reproducing means reproduces signals recorded in one track and to invert the phase of said re-converting carrier at each successive line interval when said reproducing means reproduces signals recorded in the next adjacent track, and a frequency re-converter coupled to said reproducing means and to said phase inversion means for re-converting the reproduced chrominance component to said original chrominance subcarrier frequency condition in response to said re-converting carrier.

6. The apparatus of claim 5 wherein said reproduced chrominance component includes a burst signal; and wherein said source of re-converting carrier comprises means for separating the burst signal from the re-converted chrominance component; means for generating a first oscillating signal phase-synchronized with said separated burst signal; means for generating a second oscillating signal having a frequency synchronized with the horizontal line frequency of the composite video signal; and means for mixing said first and second oscillating signals to produce said re-converting carrier.

7. The apparatus of claim 6 wherein said means for generating said first oscillating signal comprises automatic phase control means for generating said first oscillating signal of a first oscillating frequency equal to $f_s - \frac{1}{4}f_h$, where $f_s$ is the original chrominance subcarrier frequency and $f_h$ is the horizontal line frequency.

8. The apparatus of claim 7 wherein said means for generating said second oscillating signal comprises automatic frequency control means for generating said second oscillating signal of a second oscillating frequency equal to a multiple of the horizontal line frequency.

9. The apparatus of claim 6 wherein said phase inversion means is coupled to the frequency conversion means of said combining means such that the frequency re-converted cross-talk component is converted in response to said re-converting carrier.

10. The apparatus of claim 5 wherein said combining means further comprises phase splitting means coupled to said subtracting means for producing a pair of oppositely-phased, cross-talk free, frequency-converted chrominance components; and switch means controlled in synchronism with said phase inversion means by said phase control means to select one phase of said cross-talk free, frequency-converted chrominance component when said reproducing means reproduces signals recorded in one track and to select an alternate one of said opposite phases of said cross-talk free, frequency-converted chrominance component at each successive line interval when said reproducing means reproduces signals recorded in the next adjacent track.

11. A system for transferring a composite video signal from successive record tracks on a first record medium to successive record tracks on a second record medium, the composite video signal in adjacent tracks on said first record medium having frequency-modulated luminance components superimposed with frequency-converted chrominance components, the chrominance carriers of the latter components exhibiting a frequency interleaved relationship with respect to each other, said system comprising:

reproducing apparatus for scanning successive tracks of said first record medium to reproduce the composite video signal from each track, including:
- a luminance channel for recovering the luminance components from the reproduced composite video signal, and a luminance output terminal for receiving the recovered luminance components; and
- a chrominance channel for recovering the frequency-converted chrominance components, together with accompanying cross-talk components picked up from an adjacent track, from the reproduced composite video signal, cross-talk separating means, including comb filter means, for separating the cross-talk components from the recovered frequency-converted chrominance components, combining means for combining said separated cross-talk components and said recovered frequency-converted chrominance components to produce frequency-converted chrominance components substantially free of cross-talk components, and a chrominance output terminal for receiving the cross-talk free frequency-converted chrominance components; and recording apparatus for scanning successive tracks of said second record medium to record the composite video signal in each track thereof, including:
- a luminance channel having a luminance input terminal coupled to the luminance output terminal of said reproducing apparatus for receiving luminance components;
- a chrominance channel having a chrominance input terminal coupled to the chrominance output terminal of said reproducing apparatus for receiving cross-talk free frequency-converted chrominance components;
- superimposing means coupled to said last-mentioned luminance and chrominance channels for superimposing the luminance components and the cross-talk free frequency-converted chrominance components; and
- recording means coupled to said superimposing means for recording the superimposed luminance and cross-talk free frequency-converted chrominance components in successive tracks on said second record medium.

12. The system of claim 11 wherein the luminance channel of said reproducing apparatus includes demodulating means for demodulating the frequency-modulated luminance components recovered from said reproduced composite video signal, said luminance output terminal receiving the demodulated luminance components; and wherein the luminance channel of said recording apparatus includes frequency modulating means for frequency modulating the demodulated luminance components.

13. the system of claim 11 wherein the frequency-converted chrominance components recorded on said first record medium have a chrominance subcarrier whose frequency has been converted from an original frequency range to a converted frequency range; and wherein said cross talk separating means includes frequency re-conversion means for re-converting said frequency-converted chrominance components and accompanying cross-talk components back to said original frequency range; means for supplying the frequency re-converted chrominance and cross-talk components to said comb filter means to derive the frequency re-converted cross-talk components; and frequency conversion means for converting the frequency re-converted cross-talk components to said converted frequency range and to supply the converted cross-talk components to said combining means.

14. The system of claim 13 wherein said frequency-converted chrominance components are recorded in one track on said first record medium with a chrominance carrier of constant phase in successive line intervals and are recorded in the next adjacent track with a chrominance carrier whose phase is inverted at each successive line interval; and further comprising a source of re-converting carrier, phase inversion means for selectively inverting the phase of said re-converting carrier, phase control means for controlling said phaase inversion means to invert the phase of said re-converting carrier at each successive line interval when the composite video signal is reproduced from one track and to maintain the phase of said re-converting carrier constant when the composite video signal is reproduced from the next adjacent track, and means for coupling said phase inversion means to said frequency re-conversion means and to said frequency conversion means to supply same with said re-converting carrier.

15. The system of claim 14 wherein said first record medium additionally has control signals recorded thereon, said control signals identifying the tracks in which the phase of said chrominance carrier exhibits a predetermined condition; wherein said reproducing apparatus includes means for reproducing said control signals as successive tracks are scanned; and wherein said phase control means comprises horizontal synchronizing signal separator means for separating horizontal synchronizing signals from the recovered luminance components and signal generating means supplied with said reproduced control signals and said horizontal synchronizing signals to produce a phase control signal of alternating value when said one track is scanned and of substantially fixed value having a frequency one-half the horizontal synchronizing signal frequency when the next adjacent rack is scanned.

16. The system of claim 15 wherein said reproducing apparatus further includes a control signal output terminal for receiving said reproduced control signals; and wherein said recording apparatus includes a control signal input terminal coupled to the control signal output terminal of said reproducing appaaratus for receiving said control signals, means for recording said control signals on said second record medium as successive tracks are scanned thereon, and means responsive to said control signals for controlling the scanning of said tracks on said second record medium in synchronism with said control signals.

17. The system of claim 14 wherein said first record medium additionally has control signals recorded thereon, said control signals identifying the tracks in which the phase of said chrominance carrier exhibits a predetermined condition; wherein said reproducing apparatus includes means for reproducing said control signals as successive tracks are scanned, and means responsive to said reproduced control signals for controlling the scanning of said tracks in synchronism therewith; wherein said phase control means comprises pulse generating means for generating pulses representing the actual scanning of said tracks, horizontal synchronizing signal separator means for separating horizontal synchronizing signals from the recovered luminance components, and signal generating means supplied with said generated pulses and said horizontal synchronizing signals to produce a phase control signal of alternating value when said one track is scanned and of substantially fixed value having a frequency one-half the horizontal synchronizing signal frequency when the next adjacent track is scanned; and wherein the chrominance channel of said reproducing apparatus further includes phase splitting means coupled to said combining means for producing a pair of oppositely-phased, cross-talk free, frequency-converted chrominance components, and switch means interposed between said phase splitting means and said chrominance output terminal and controlled by said phase control signal to select one or the other phase of said cross-talk free, frequency-converted chrominance component to be supplied to said chrominance output terminal.

18. The system of claim 17 wherein said recording apparatus includes synchronizing separator means for separating horizontal and vertical synchronizing signals from the luminance components received by the luminance channel therein, means responsive to the vertical synchronizing signals for controlling the scanning of said tracks on said second record medium in synchronism therewith, pulse generating means for generating pulses representing the actual scanning of said tracks on said second record medium, and signal generating means supplied with said last-mentioned pulses and with the horizontal synchronizing signals separated from the luminance components received by the luminance channel of said recording apparatus to produce a recording phase control signal of alternating value when one track on said second record medium is scanned and of substantially fixed value having a frequency one-half the horizontal synchronizing signal frequency when the next adjacent track on said second record medium is scanned; and wherein the chrominance channel of said recording apparatus includes phase splitting means coupled to said chrominance input terminal for producing a pair of oppositely-phased frequency-converted chrominance components, and switch means interposed between said phase splitting means and said superimposing means and controlled by said recording phase control signal to supply one or the other phase of said frequency-converted chrominance components to said superimposing means.

19. The system of claim 11, wherein said recording apparatus further includes a video input terminal for receiving a composite video signal, first selector switch means having a first condition for coupling said video input terminal to said luminance and chrominance channels therein and a second condition for coupling said luminance input terminal to at least said luminance channel, said luminance channel including frequency modulating means for frequency modulating luminance components supplied thereto, said chrominance channel including frequency-converting means for frequency-converting chrominance components supplied thereto from said video input terminal, and said chrominance channel further including second selector switch means having a first condition for coupling said frequency-converting means in said chrominance channel to said superimposing means and a second condition for coupling said chrominance input terminal to said superimposing means.

* * * * *